(12) United States Patent
Yue et al.

(10) Patent No.: US 10,712,249 B2
(45) Date of Patent: Jul. 14, 2020

(54) HIGH-TEMPERATURE, HIGH-PRESSURE, AND LOW-VELOCITY GAS MICROTUBE VISCOSITY MEASURING APPARATUS AND MEASURING METHOD THEREOF

(71) Applicant: China University of Petroleum—Beijing, Beijing (CN)

(72) Inventors: Xiang'an Yue, Beijing (CN); Xin Fang, Beijing (CN); Weiqing An, Beijing (CN); Wenhao Tian, Beijing (CN); Jirui Zou, Beijing (CN); Xuegang Feng, Beijing (CN); Wei Fang, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 151 days.

(21) Appl. No.: 16/138,873

(22) Filed: Sep. 21, 2018

(65) Prior Publication Data
US 2019/0226964 A1     Jul. 25, 2019

(30) Foreign Application Priority Data
Jan. 23, 2018 (CN) .......................... 2018 1 0063791

(51) Int. Cl.
*G01N 11/08*     (2006.01)
(52) U.S. Cl.
CPC ................ *G01N 11/08* (2013.01)

(58) Field of Classification Search
CPC .. G01N 11/00; G01N 2011/006; G01N 11/02; G01N 11/04; G01N 11/08
USPC ....... 73/30.01, 31.04, 31.05, 152.18, 152.51, 73/198, 714
See application file for complete search history.

(56) References Cited

FOREIGN PATENT DOCUMENTS

| CN | 1501061 A | * | 6/2004 | ............. G01N 11/00 |
| CN | 204594519 U | | 8/2015 | |
| CN | 204594616 U | | 8/2015 | |

\* cited by examiner

*Primary Examiner* — Benjamin R Schmitt
(74) *Attorney, Agent, or Firm* — Loza & Loza, LLP; Michael F. Fedrick

(57) ABSTRACT

A high-temperature, high-pressure, and low-velocity gas microtube viscosity measuring apparatus that comprises a thermotank, a fluid filtering and measuring device, a micro-pressure difference metering device, and a data acquisition and processing system. The fluid filtering and measuring device includes a filter, a microtube connector, a flow rate measuring liquid storage tank, an automatic micro-flow rate metering device, and an intermediate container connected in series via pipelines. The micro-pressure difference metering device is connected at two ends to pipelines at the two ends of the microtube connector via detection pipelines. The data acquisition and processing system is electrically connected to the micro-pressure difference metering device and the automatic micro-flow rate metering device to receive pressure difference data and flow rate data.

19 Claims, 3 Drawing Sheets

HIGH-TEMPERATURE, HIGH-PRESSURE, AND LOW-VELOCITY GAS MICROTUBE VISCOSITY MEASURING APPARATUS AND MEASURING METHOD THEREOF

CROSS REFERENCE TO RELATED APPLICATIONS

This application claims priority to Chinese Invention Patent Application No. 201810063791.0, filed on Jan. 23, 2018, which is fully incorporated herein by reference in its entirety.

TECHNICAL FIELD

The present invention belongs to the fields of oil and gas exploration, chemical engineering and the like, and specifically relates to a gas viscosity measurement technology, in particular to an apparatus and a method for measuring a viscosity of a gas at a micro-flow velocity in a high-temperature and high-pressure environment.

BACKGROUND ART

The viscosity is an important property of the gas, and it is greatly influenced by the temperature and pressure. Especially in a high-temperature and high-pressure environment, any small change in the temperature and pressure will largely influence the viscosity of the gas. Thus, it is crucial in scientific research and practical production to accurately acquire gas viscosity data under high-temperature and high-pressure condition. Methods for acquiring the gas viscosity include a calculation method and a measuring method.

The conventional gas viscosity calculation models include the Lennard-Jones model, the Stockmayer model, the Thodos model, etc., which are based on the theory of molecular kinematics under an assumption of rarefied gas. Thus, these models are only applicable to the gas viscosity calculation under the low-pressure condition rather than high-temperature and high-pressure condition.

The conventional viscosity measuring instruments include the capillary viscometer, the vibratory viscometer, the falling ball viscometer, and the rotational viscometer. Among these viscometers, the falling ball viscometer and the rotational viscometer are applicable to measure the liquid viscosity rather than the gas viscosity; the vibratory viscometer employs a quantitative relationship between the vibration attenuation and the measured fluid viscosity to measure the gas viscosity. Currently there is no gas viscosity measuring instrument which is practical under the high-temperature and high-pressure condition.

The capillary viscometer employs the Hagen-Poiseuille flow principle to measure the viscosity of the medium. At present, in the research reports on the capillary gas viscometers, the length of the capillary tube is usually increased to satisfy the measurability of the pressure difference which must be kept small enough to agree with the linear flow assumption of the H-P formula. In addition, due to the limitation of the micro-flow metering technology under the high-pressure condition, the difficulty in the micro-flow metering under the high-pressure condition is avoided by increasing the flow velocity. Under such test conditions of long tube and high flow velocity, it has to introduce an inlet (outlet) correction coefficient, a slippage correction coefficient, and a gas compressibility correction coefficient into the H-P formula. The uncertainty of the values of those correction coefficients brings many errors and an uncertainty to the measurement result.

In view of the above problems, based on the production and design experiences in this and related fields, the inventor has developed a high-temperature, high-pressure, and a low-velocity gas microtube viscosity measuring apparatus and a measuring method thereof, which can ignore the flow condition (flow velocity) and the device structure parameters (tube diameter and tube length) of the above correction coefficients, so as to solve the problems existing in the prior art.

SUMMARY OF THE INVENTION

An objective of the present invention is to provide a high-temperature, high-pressure, and low-velocity gas microtube viscosity measuring apparatus and a measuring method thereof, so as to accurately measure the slight pressure difference across two ends of the short micro-tube and the tiny flow rate, thereby achieving the accurate measurement of the gas viscosity under the high-temperature and high-pressure condition.

For this purpose, the present invention provides a high-temperature, high-pressure, and low-velocity gas microtube viscosity measuring apparatus, comprising:

a thermotank;

a fluid filtering and measuring device, including a filter, a microtube connector, a flow rate measuring liquid storage tank, an automatic micro-flow rate metering device, and an intermediate container connected in order and in series via pipelines, a viscosity measuring microtube being axially fixed inside the microtube connector, the filter, the microtube connector, and the flow rate measuring liquid storage tank being located in the thermotank, and two ends of the viscosity measuring microtube being in communication with the pipelines at two ends of the microtube connector, respectively;

a micro-pressure difference metering device, two ends of which are connected to the pipelines at the two ends of the microtube connector via detection pipelines, respectively; and a data acquisition and processing system electrically connected to the micro-pressure difference metering device and the automatic micro-flow rate metering device to receive pressure difference data and flow rate data.

In the aforementioned high-temperature, high-pressure, and low-velocity gas microtube viscosity measuring apparatus, the microtube connector comprises:

a connector body, throughout which a front flow channel is formed axially, the front flow channel including in sequential order an entry section, a front positioning section, a front sealing cavity, and an interface section, an inner diameter of the front positioning section being smaller than an inner diameter of either of the entry section and the front sealing cavity, and the inner diameter of the front sealing cavity being smaller than an inner diameter of the interface section;

a sealing cap, throughout which a rear flow channel is formed axially, the rear flow channel including in sequential order a rear sealing cavity, a rear positioning section, and an exit section, an outer surface of a front end of the sealing cap being reduced in diameter to form a joint portion, the joint portion being plugged into the interface section, and the rear sealing cavity being in communication with an inner cavity of the interface section, wherein the two ends of the viscosity measuring microtube are plugged into the front positioning section and the rear positioning section in a sealed manner, respectively, and the entry section and the exit section are respectively in threaded connection with the pipelines at the two ends of the microtube connector through internal threads in a sealed manner.

In the aforementioned high-temperature, high-pressure, and low-velocity gas microtube viscosity measuring apparatus, paraffin is filled between an inner wall of the front positioning section and an outer surface of the viscosity measuring microtube, sealant is infused into the interface section, and when the joint portion is plugged into the interface section, the sealant can be pressed into the front sealing cavity and the rear sealing cavity, respectively.

In the aforementioned high-temperature, high-pressure, and low-velocity gas microtube viscosity measuring apparatus, the viscosity measuring microtube is a micron-scale capillary tube having a tube diameter of not less than 20 μm and a length of not less than 30 mm.

The present invention further proposes a measuring method of the high-temperature, high-pressure, and low-velocity gas microtube viscosity measuring apparatus, comprising the steps of:

1) selecting and mounting a viscosity measuring microtube having an appropriate tube diameter into the microtube connector, and adjusting the thermotank to a measurement temperature;

2) delivering a gas to be measured from an input pipeline through the filter for filtration, through the viscosity measuring microtube of the microtube connector into the flow rate measuring liquid storage tank, so that the gas to be measured drives measuring liquid in the flow rate measuring liquid storage tank into the automatic micro-flow rate metering device;

3) transmitting pressure data at the two ends of the microtube connector measured by the micro-pressure difference metering device, and flow rate data measured by the automatic micro-flow rate metering device to the data acquisition and processing system, to obtain a viscosity of the gas to be measured by calculation; and 4) changing an input pressure of the gas to be measured, and repeating steps 2) and 3) to obtain viscosities of the gas under the different pressures.

In the aforementioned measuring method of the high-temperature, high-pressure, and low-velocity gas microtube viscosity measuring apparatus, after the data acquisition and processing system receives the pressure data and the flow rate data in step 3), the gas viscosity is calculated in the following formula:

$\mu_0 = \pi r^4 (p^2_1 - p^2_2)/16Q\beta L p_2$, wherein $p_1$ denotes a pressure of fluid at an inlet of the viscosity measuring microtube, $p_2$ denotes a pressure of fluid at an outlet of the viscosity measuring microtube, L denotes a length of the viscosity measuring microtube, r denotes a radius of the viscosity measuring microtube, Q denotes a flow rate volume measured by the automatic micro-flow rate metering device, and $\beta$ denotes a temperature correction coefficient of the measuring liquid.

In the present invention, the microtube connector is employed to realize a cross-scale connection between the viscosity measuring microtube and the experimental device; the automatic micro-flow rate metering device and the micro-pressure difference metering device cooperate with the viscosity measuring microtube, which not only ensures that the measured gas is in a low-speed laminar state in the viscosity measuring microtube, but also achieves the high-precision measurement of the laminar flow and the micro-flow rate of the gas in microtubule. In addition, the use of the viscosity measuring microtube forms a micro-pressure difference across two ends, which can greatly reduce the influence of the value of the expansion coefficient on the measurement result, thereby eliminating the influence of the additional inertia caused by the bending of the long tube on the measurement result.

In the present invention, the operations are simple and convenient, which overcomes the technical bottleneck of the existing capillary viscometer measuring the gas viscosity, and can accurately measure the slight pressure difference across two ends of the short micro-tube and the tiny flow rate, thereby achieving the accurate measurement of the gas viscosity under the high-temperature ($\leq 0.150°$ C.) and high-pressure ($\leq 120$ MPa) condition in a real sense.

In the present invention, the viscosity measuring microtube is preferably a micron-scale capillary tube having a shortest length of 30 mm, and a minimum tube diameter may be 20 μm by eliminating the influence of the gas micro-scale flow effect. As compared with the existing capillary viscometer, the viscosity measuring microtube of the present invention reduces the uncertainty caused by the artificial setting of the correction coefficient, and the reduction of the diameter can improve the accuracy of the gas viscosity measurement. In the present invention, the lower limit of the measurable viscosity can be 7 gas, and the viscosities of many types of gases can be measured, such as $N_2$, $CO_2$, $CH_4$ and mixed gas.

BRIEF DESCRIPTION OF THE DRAWINGS

The following drawings are only intended to schematically illustrate and explain the present invention, rather than limiting to the scope of the present invention.

REFERENCE NUMERALS OF MAIN COMPONENTS

Figure 1:
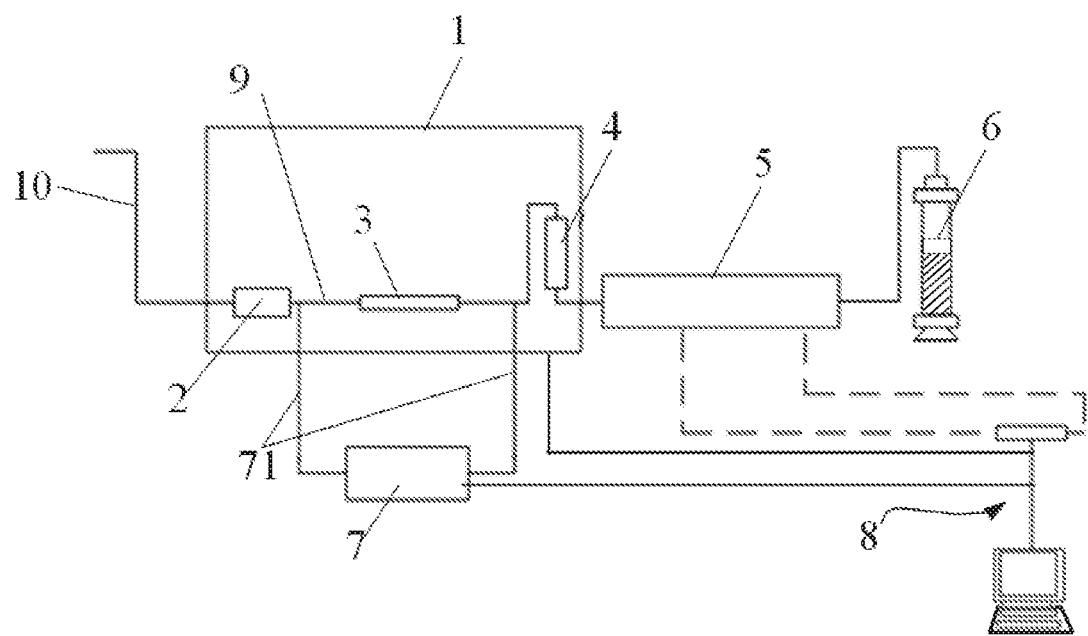
FIG. 1 is a structural view of a high-temperature, high-pressure and low-velocity gas microtube viscosity measuring apparatus according to the present invention.

| 1 | thermotank | 2 | filter |
|---|---|---|---|
| 3 | microtube connector | 30 | viscosity measuring microtube |
| 31 | connector body | | |
| 310 | front flow channel | 311 | entry section |
| 312 | front positioning section | 313 | front sealing cavity |
| 314 | interface section | 32 | sealing cap |
| 320 | rear flow channel | 321 | rear sealing cavity |
| 322 | rear positioning section | 323 | exit section |
| 324 | joint portion | 4 | flow rate measuring liquid storage tank |
| 5 | automatic micro-flow rate metering device | 6 | intermediate container |
| 7 | micro-pressure difference metering device | 71 | detection pipeline |
| 8 | data acquisition and processing system | 9 | pipeline |
| 10 | input pipeline | | |

DETAILED DESCRIPTION

The present invention provides a high-temperature, high-pressure, and low-velocity gas microtube viscosity measuring apparatus, comprising: a thermotank; a fluid filtering and measuring device, including a filter, a microtube connector, a flow rate measuring liquid storage tank, an automatic micro-flow rate metering device, and an intermediate container connected in order and in series via pipelines, a viscosity measuring microtube being axially fixed inside the microtube connector, the filter, the microtube connector, and the flow rate measuring liquid storage tank being located in the thermotank, and two ends of the viscosity measuring microtube being in communication with the pipelines at two ends of the microtube connector, respectively; a micro-pressure difference metering device, two ends of which are connected to the pipelines at the two ends of the microtube connector via detection pipelines, respectively; and a data acquisition and processing system electrically connected to the micro-pressure difference metering device and the automatic micro-flow rate metering device to receive pressure difference data and flow rate data.

The present invention further proposes a measuring method for a high-temperature, high-pressure, and low-velocity gas microtube viscosity measuring apparatus, comprising the steps of: 1) selecting and mounting a viscosity measuring microtube having an appropriate tube diameter into the microtube connector, and adjusting the thermotank to a measurement temperature; 2) delivering a gas to be measured from an input pipeline through the filter for filtration, through the viscosity measuring microtube of the microtube connector into the flow rate measuring liquid storage tank, so that the gas to be measured drives measuring liquid in the flow rate measuring liquid storage tank into the automatic micro-flow rate metering device; 3) transmitting pressure data at the two ends of the microtube connector measured by the micro-pressure difference metering device and flow rate data measured by the automatic micro-flow rate metering device to the data acquisition and processing system, to obtain a viscosity of the gas to be measured by calculation; and 4) changing an input pressure of the gas to be measured, and repeating steps 2) and 3) to obtain viscosities of the gas under the different pressures.

The high-temperature, high-pressure, and low-velocity gas microtube viscosity measuring apparatus and the measuring method thereof according to the present invention can accurately measure the slight pressure difference across two ends of the short micro-tube and the tiny flow rate, thereby achieving the accurate measurement of the gas viscosity under the high-temperature and high-pressure condition.

In order that the technical features, objective and effects of the present invention can be more clearly understood, specific embodiments, structures, features, and efficacies of the high-temperature, high-pressure, and low-velocity gas microtube viscosity measuring apparatus and the measuring method thereof proposed by the present invention are described in detail as follows with reference to the drawings and preferred embodiments. In addition, through the description of the specific embodiments, the technical means adopted by the present invention to achieve the intended purpose and the efficacies can be understood more deeply and concretely. However, the drawings are merely intended to provide references and explanations rather than limiting the present invention.

Figure 2:
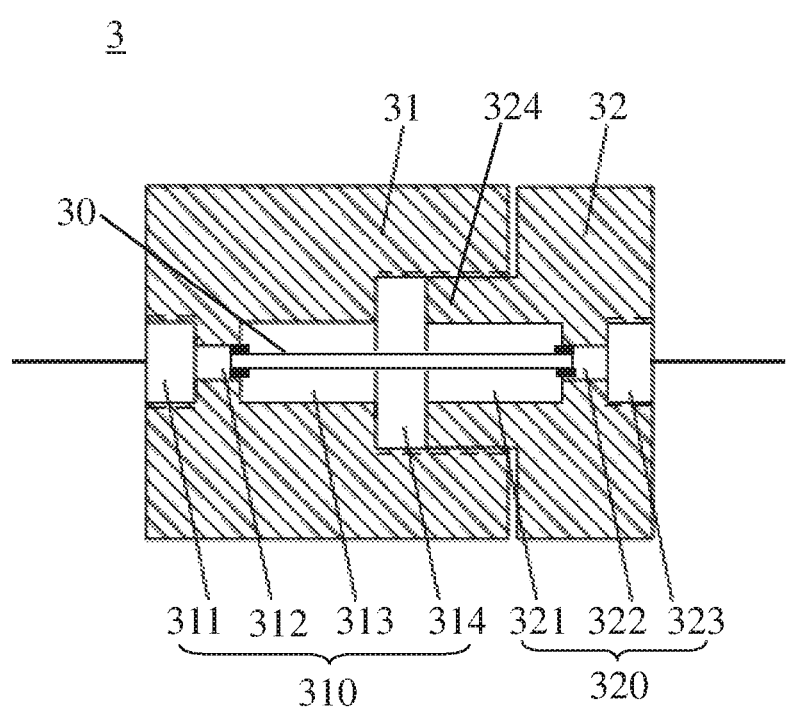
FIG. 2 is a cross-sectional view of a microtube connector in the present invention.

FIG. 1 is a structural view of a high-temperature, high-pressure and low-velocity gas microtube viscosity measuring apparatus according to the present invention. FIG. 2 is a cross-sectional view of a microtube connector in the present invention.

As shown in FIG. 1, the high-temperature, high-pressure and low-velocity gas microtube viscosity measuring apparatus proposed by the present invention comprises a thermotank 1, a fluid filtering and measuring device, a micro-pressure difference metering device 7, and a data acquisition and processing system 8. The fluid filtering and measuring device comprises a filter 2, a microtube connector 3, a flow rate measuring liquid storage tank 4, an automatic micro-flow rate metering device 5, and an intermediate container 6 connected in order and in series via pipelines 9. A viscosity measuring microtube 30 is axially fixed inside the microtube connector 3. The filter 2, the microtube connector 3, and the flow rate measuring liquid storage tank 4 are located in the thermotank 1. Two ends of the viscosity measuring microtube 30 are in communication with pipelines at two ends of the microtube connector 3, respectively. Therefore, by providing the microtube connector 3, a cross-scale connection between the viscosity measuring microtube and measurement experiment devices (such as the filter, the flow rate measuring liquid storage tank 4, etc.) is realized.

Two ends of the micro-pressure difference metering device 7 are connected to the pipelines 9 at the two ends of the microtube connector via detection pipelines 71, respectively.

The data acquisition and processing system 8 monitors and records the pressure, the pressure difference, the flow rate, the temperature, etc. of the test in real time, and it is electrically connected to the micro-pressure difference metering device 7 and the automatic micro-flow rate metering device 5 to receive pressure difference data and flow rate data. During practical working, a computer system may be used as the data acquisition and processing system 8. In addition, in a preferred embodiment, as shown in the drawings, the thermotank 1 may be further connected to the data acquisition and processing system 8 (computer system) to facilitate the transmission and storage of the temperature data.

During the practical assembly, the flow rate measuring liquid storage tank, the automatic micro-flow rate metering device, the intermediate container, the micro-pressure difference metering device, and the data acquisition and processing system described above may be chosen upon demand. For example, the thermotank 1 may be a high-precision thermotank with a maximum temperature of 150° C. and a temperature control accuracy of 0.1° C.; preferably, the automatic micro-flow rate metering device may be an automatic fluid micro-flow rate metering device (e.g., Chinese Patent No. ZL201520209211.6), with a measurement accuracy of 100 nL/min; the micro-pressure difference metering device 7 is preferably a micro-pressure difference metering device for high-pressure experiments (Chinese Patent No. ZL201520227522.5), and a lower limit of the micro pressure difference that can be measured by the device is $10^{-5}$ MPa. The specific structures and working principles of the above devices are omitted herein since they are technologically the same.

In the high-temperature, high-pressure and low-velocity gas microtube viscosity measuring apparatus according to the present invention, the microtube connector 3 is employed to realize a cross-scale connection between the micrometer-scale viscosity measuring microtube and the millimeter-scale experimental device such as the pipelines; the automatic micro-flow rate metering device 5 and the micro-pressure difference metering device 7 cooperate with the viscosity measuring microtube, which not only ensures that a gas to be measured is in a low-speed laminar state in the viscosity measuring microtube, but also achieves the high-precision measurement of the laminar flow and the micro-flow rate of the gas in microtubule. In addition, the use of the viscosity measuring microtube forms a micro-pressure difference across two ends, which can greatly reduce the influence of a value of the expansion coefficient on the measurement result, thereby eliminating the influence of the additional inertia caused by the bending of the long tube on the measurement result.

Referring to FIG. 2, the microtube connector 3 comprises a connector body 31 and a sealing cap 32. A front flow channel 310 is formed axially throughout the connector body 31. The front flow channel 310 includes in the following order an entry section 311, a front positioning section 312, a front sealing cavity 313, and an interface section 314. An inner diameter of the front positioning section 312 is smaller than an inner diameter of either of the entry section 311 and the front sealing cavity 313, and the inner diameter of the front sealing cavity 313 is smaller than an inner diameter of the interface section 314.

A rear flow channel 320 is formed axially throughout the sealing cap 32. The rear flow channel 320 includes in sequential order a rear sealing cavity 321, a rear positioning section 322, and an exit section 323. An outer surface of a front end of the sealing cap 32 is reduced in diameter to form a joint portion 324, which is plugged into the interface section 314. The rear sealing cavity 321 is in communication with an inner cavity of the interface section 314. The two ends of the viscosity measuring microtube 30 are plugged into the front positioning section 312 and the rear positioning section 322 in a sealed manner, respectively, and the entry section 311 and the exit section 323 are respectively in threaded connection with the pipelines 9 at the two ends of the microtube connector 3 through internal threads in a sealed manner.

A sealing material such as paraffin is filled between an inner wall of the front positioning section 312 and an outer surface of the viscosity measuring microtube 30. Sealant is infused into the interface section 314; when the joint portion 324 is plugged into the interface section 314, the sealant can be pressed into the front sealing cavity 313 and the rear sealing cavity 321, respectively, so that the inner cavity of the microtube connector 3 is full of the high-temperature and high-pressure sealant, which can greatly reduce the shear stress of the fluid on the microtube connector 3, so that the microtube connector 3 is only subjected to an axial force, thereby preventing the viscosity measuring microtube in the microtube connector 3 from being damaged due to the shear stress in a lateral direction.

It is preferable that the viscosity measuring microtube 30 is a micron-scale capillary tube having a tube diameter of not less than 20 μm and a length of not less than 30 mm. In specific applications, the lower limit of the inner diameter of the viscosity measuring microtube is set based on a principle that a microscale flow effect of high-pressure gas is not generated. In the present invention, a micron-scale tube is employed as the viscosity measuring microtube to achieve a low gas flow velocity, thereby avoiding the influence of the high flow velocity kinetic energy correction coefficient on the measurement result.

The present invention further proposes a measuring method of a high-temperature, high-pressure, and low-velocity gas microtube viscosity measuring apparatus, comprising the steps of:

1) selecting and mounting a viscosity measuring microtube having an appropriate tube diameter into the microtube connector, and adjusting the thermotank 1 to a measurement temperature; in practical applications, the measurement temperature is usually selected in a range of 25° C. to 150° C. as required, which is not described in detail herein; in addition, a high-pressure range as referred to herein is usually from the standard atmospheric pressure to 120 MPa;

2) delivering a gas to be measured from an input pipeline 10 through the filter 2 for filtration, through the viscosity measuring microtube of the microtube connector 3 into the flow rate measuring liquid storage tank 4, so that the gas to be measured drives a measuring liquid in the flow rate measuring liquid storage tank 4 into the automatic micro-flow rate metering device 5; according to the principle of volume conservation, as physical and chemical reactions of gas and liquid are ignorable under the same temperature and pressure, an amount of the input gas is equal to an amount of the discharged liquid, so that the flow rate of the gas to be measured can be measured;

3) transmitting pressure data at the two ends of the microtube connector 3 measured by the micro-pressure difference metering device 7, and flow rate data measured by the automatic micro-flow rate metering device 5 to the data acquisition and processing system 8, respectively, for calculation to obtain a viscosity of the gas to be measured; and 4) changing an input pressure of the gas to be measured and repeating steps 2) and 3) to obtain viscosities of the gas under the different pressures.

Since a temperature correction needs to be performed to the volume of the high-temperature measuring liquid flowing from the flow rate measuring liquid storage tank 4 into the automatic micro-flow rate metering device 5, after the data acquisition and processing system receives the pressure data and the flow rate data in step 3), the viscosity of the gas is calculated in the following Hagen-Poiseuille formula:

$\mu_0 = \pi r^4 (p_1^2 - p_2^2)/16Q\beta L p_2$, wherein $p_1$ denotes a pressure of fluid at an inlet of the viscosity measuring microtube, $p_2$ denotes a pressure of fluid at an outlet of the viscosity measuring microtube, L denotes a length of the viscosity measuring microtube, r denotes a radius of the viscosity measuring microtube, Q denotes a flow rate volume measured by the automatic micro-flow rate metering device, and β denotes a temperature correction coefficient of the measuring liquid.

In specific tests, regarding the present invention, in order to avoid the introduction of the flow condition (flow velocity) of the correction coefficient and the device structure parameters (tube diameter and tube length) into the Hagen-Poiseuille formula, it is preferable that a tube diameter of the micron-scale capillary tube used as the viscosity measuring microtube 30 is determined on the basis of the principle that the influence of the slippage effect can be ignored; the gas flow velocity is selected on the basis of the principle that the influence of the inlet (outlet) end effect of the viscosity measuring microtube can be ignored; and the pressure difference applied across the two ends of the viscosity measuring microtube 30 is determined on the basis of the principle that the influence of the gas compressibility can be ignored.

Figure 3:
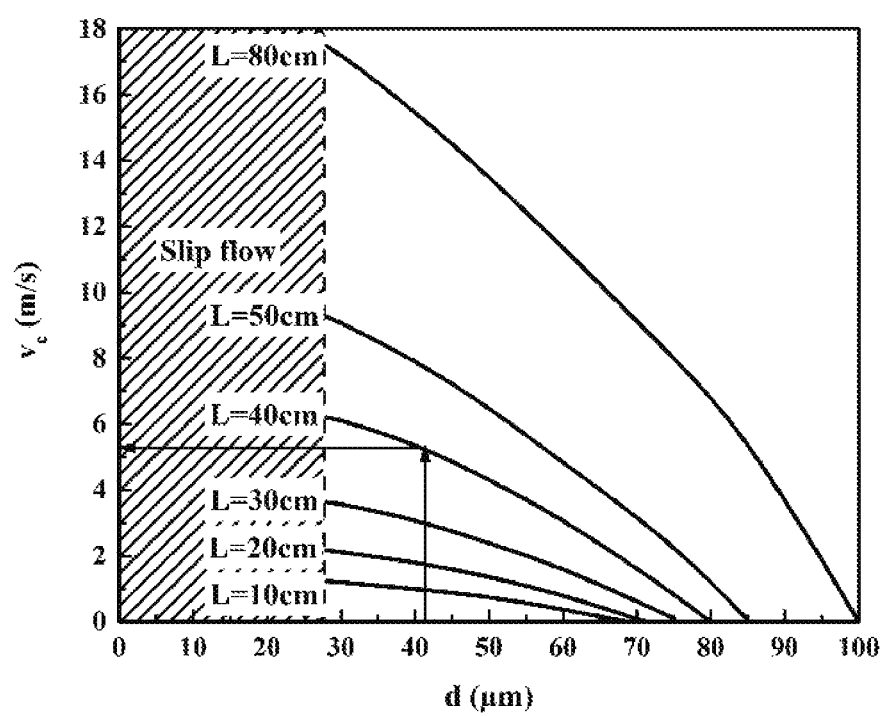
FIG. 3 illustrates a curve of viscosity measuring critical condition ignoring a slippage effect and an end face effect in a measuring method according to an embodiment of the present invention.

In a specific embodiment, a tube diameter d and a tube length L of the viscosity measuring microtube and a flow velocity v of the gas to be measured are determined in the steps of:

a1): drawing a curve of viscosity measuring critical condition ignoring a slippage effect and an end face effect: determining a minimum tube diameter $d_{sc}$ of the viscosity measuring microtube for which the slippage effect can be ignored, determining a maximum tube diameter $d_{ec}$ of the viscosity measuring microtube for which the end face effect can be ignored, determining a minimum tube length $L_c$ of the viscosity measuring microtube for which the end face effect can be ignored, determining a maximum gas flow velocity $v_c$ for which the end face effect can be ignored, and drawing a curve of relationship between corresponding maximum flow velocity and each of the tube diameters of a plurality of viscosity measuring microtubes of different tube lengths while satisfying a condition L>$L_c$ within a range of $d_{sc} \leq d \leq d_{ec}$, as the curve of viscosity measuring critical condition ignoring the slippage effect and the end face effect, as illustrated in FIG. 3;

a2): determining a critical pressure gradient $Dp_c$ for which a compression effect can be ignored;

a3): selecting a tube diameter d of the viscosity measuring microtube within a range of $1.1d_{sc} < d < 0.9d_{ec}$ in the curve of viscosity measuring critical condition;

a4): initially determining a tube length L of the viscosity measuring microtube according to structure design requirements of the viscosity measuring apparatus;

a5): finding out corresponding maximum flow velocity $v_c$ from the curve of viscosity measuring critical condition according to the tube diameter and the tube length initially determined, and determining the flow velocity of the gas to be measured is $v \leq 0.8v_c$; and a6): checking the compression effect: testing pressure data $p_1$ and $p_2$ at two ends of the viscosity measuring microtube (i.e. pressure data at two ends of the microtube connector 3) using the tube diameter d, the tube length L and the flow velocity v initially selected in the order of step 1) to step 3), to obtain a pressure difference $\Delta p = p_1 - p_2$; checking the compression effect with the measured pressure difference $\Delta p$, and if $|\Delta p/L| \leq Dp_c$, the tube diameter d, the tube length L and the flow velocity v initially selected are appropriate, otherwise increasing the tube length L or decreasing the flow velocity v until $|\Delta p/L| \leq Dp_c$.

Further, the minimum tube diameter $d_{sc}$ of the viscosity measuring microtube for which the slippage effect can be ignored is determined in the steps of:

b1): calculating a molecular free path of the gas to be measured in the following formula:

$$\lambda = \frac{k_B T}{\sqrt{2}\, \pi d_m^2 P},$$

wherein $\lambda$ denotes a molecular free path, $k_B$ denotes a Boltzmann constant, T denotes a Kelvin temperature, $d_m$ denotes an effective diameter of a gas molecule, and P is a pressure of the gas, wherein $P=(p_1+p_2)/2$;

b2): according to Knudsen theory, calculating a critical tube diameter $d_c$ for which the slippage effect of the gas can be ignored when Kn=0.001: $d_c=\lambda/Kn$, drawing a curve of relationship between the critical tube diameter $d_c$ and the pressure P, and determining a maximum value ($d_{c,\,max}$) of the critical tube diameter $d_c$ in the curve;

b3): connecting a plurality of viscosity measuring microtubes of different tube diameters into the microtube connector, respectively, and sequentially testing the viscosities $\eta_{exp}$ of the gas for each of the viscosity measuring microtubes at different pressure differences in the order of step 1) to step 4), under a normal pressure and a condition that the pressure difference $\Delta p$ across the two ends of the viscosity measuring microtube is less than 0.2 MPa;

b4): drawing a curve of relationship between the viscosity $\eta_{exp}$ of the gas and the tube diameter d, wherein in the curve, the viscosity of the gas that does not vary with the increase of the tube diameter d is a viscosity $\eta_{exp}$ of the gas for which the slippage effect can be ignored;

b5): calculating a slippage viscosity measuring deviation rate $\eta_{sr}$ of each of the viscosity measuring microtubes: $\eta_{sr}=(\eta_{exp}-\eta_{ns})/\eta_{ns}$, drawing a curve of relationship between the slippage viscosity measuring deviation rate $\eta_{sr}$ and the tube diameter d, finding a tube diameter $d_1$ that is corresponding to $\eta_{sr}=0.2\%$, and if the tube diameter $d_1$ is larger than $d_{c,\,max}$, taking the tube diameter $d_1$ as the minimum tube diameter $d_u$ of the viscosity measuring microtube, otherwise taking $d_{c,\,max}$ as the minimum tube diameter $d_{sc}$ of the viscosity measuring microtube.

Further, the critical pressure gradient $Dp_c$ for which the compression effect can be ignored is determined in the steps of:

c1): connecting a plurality of viscosity measuring microtubes of different tube diameters and tube lengths while satisfying a condition $d>d_{sc}$ into the microtube connector, respectively, and sequentially testing the viscosities $\eta_{exp}$ of the gas for each of the viscosity measuring microtubes at different pressure differences $\Delta p$ in the order of step 1) to step 4);

c2): drawing a curve of relationship between the viscosity $\eta_{exp}$ of the gas and an absolute value of a pressure gradient Dp, wherein $Dp=\Delta p/L$; in the curve, the viscosity $\eta_{exp}$ of the gas at which the absolute value of the pressure gradient tends to zero is a viscosity $\eta_{exp}$ of the gas for which the compression effect can be ignored; and c3): calculating a compression viscosity measuring deviation rate $\eta_{cr}$ of each of the viscosity measuring microtubes: $\eta_{cr}=(\eta_{exp}-\eta_{nc})/\eta_{nc}$, and drawing a curve of relationship between the compression viscosity measuring deviation rate $\eta_{cr}$ and the tube diameter d, wherein in the curve, the absolute value of the pressure gradient corresponding to $\eta_{cr}=0.2\%$ is a corrected critical pressure gradient $Dp_c$ for which the compression effect can be ignored.

Further, the maximum gas flow velocity $v_c$ for which the end face effect can be ignored is determined in the steps of:

d1): connecting a plurality of viscosity measuring microtubes of the same tube diameter and different tube lengths while satisfying the condition $d>d_{sc}$ into the microtube connector, respectively, and sequentially testing the viscosities $\eta_{exp}$ of the gas for each of the viscosity measuring microtubes at different gas flow velocities in the order of step 1) to step 4) under a condition that the pressure difference $\Delta p$ across the two ends of the viscosity measuring microtube is less than $Dp_c \cdot L$;

d2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) \Big/ \left(\frac{1}{L_1} - \frac{1}{L_2}\right),$$

wherein $L_1$ and $L_2$ denote tube lengths of any two viscosity measuring microtubes, respectively, and $\Delta p_1$ and $\Delta p_2$ denote pressure differences across two ends of the two viscosity measuring microtubes, respectively;

d3): calculating an end face equivalent viscosity $\eta_{end}$ in the following formula:

$$\eta_{end} = \frac{\pi r^4}{8q} \frac{\Delta p_{end}}{L},$$

wherein r denotes a radius of the viscosity measuring microtube, r=d/2, L denotes a tube length of the viscosity measuring microtube, L=$L_1$ or $L_2$, and q denotes a gas volume flow rate; and d4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate Tier and the flow velocity v, wherein in the curve, the flow velocity corresponding to $\eta_{er}$=0.2% is a corrected maximum flow velocity $v_c$ for which the end face effect can be ignored.

Further, the minimum tube length $L_c$ of the viscosity measuring microtube for which the end face effect can be ignored is determined in the steps of:

e1): connecting a plurality of viscosity measuring microtubes of the same tube diameter and different tube lengths while satisfying the condition d>$d_{sc}$ into the microtube connector, respectively, and measuring the viscosities $\eta_{exp}$ of the gas within a flow velocity range of v<$v_c$ in the order of step 1) to step 4), under a condition that the pressure difference across the two ends of the viscosity measuring microtube is less than $Dp_c.L$;

e2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) / \left(\frac{1}{L_1} - \frac{1}{L_2}\right),$$

wherein $L_1$ and $L_2$ denote tube lengths of any two viscosity measuring microtubes, respectively, and $\Delta p_1$ and $\Delta p_d$ denote pressure differences across two ends of the two viscosity measuring microtubes, respectively;

e3): calculating an end face equivalent viscosity $\eta_{end}$ in the following formula:

$$\eta_{end} = \frac{\pi r^4}{8q} \frac{\Delta p_{end}}{L},$$

wherein r denotes a radius of the viscosity measuring microtube, r=d/2, L denotes a tube length of the viscosity measuring microtube, L=$L_1$ or $L_2$, and q denotes a gas volume flow rate; and e4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the tube length L, wherein in the curve, the tube length corresponding to $\eta_{er}$=0.2% is a corrected minimum tube length $L_c$ for which the end face effect can be ignored.

Further, the maximum tube diameter $d_{ec}$ of the viscosity measuring microtube for which the end face effect can be ignored is determined in the steps of:

f1): selecting a plurality sets of viscosity measuring microtubes of different tube diameters while satisfying the conditions d>$d_{sc}$ and L>$L_c$, each set having two viscosity measuring microtubes of different tube lengths, connecting each of the viscosity measuring microtubes into the microtube connector, and measuring the viscosities $\eta_{exp}$ of the gas for each of the viscosity measuring microtubes within the flow velocity range of v<$v_c$ in the order of step 1) to step 4), under the condition that the pressure difference across the two ends of the viscosity measuring microtube is less than $Dp_c.L$;

f2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) / \left(\frac{1}{L_1} - \frac{1}{L_2}\right),$$

wherein $L_1$ and $L_2$ denote tube lengths of two viscosity measuring microtubes of the same tube diameter, respectively, and $\Delta p_1$ and $\Delta p_2$ denote pressure differences across two ends of the two viscosity measuring microtubes of the same tube diameter, respectively;

f3): calculating an end face equivalent viscosity $\eta_{end}$ in the following formula:

$$\eta_{end} = \frac{\pi r^4}{8q} \frac{\Delta p_{end}}{L},$$

wherein r denotes a radius of the viscosity measuring microtube, r=d/2, L denotes a tube length of the viscosity measuring microtube, L=$L_1$ or $L_2$, and q denotes a gas volume flow rate; and f4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the tube diameter d, wherein in the curve, the tube diameter corresponding to $\eta_{er}$=0.2% is a corrected maximum tube diameter $d_{ec}$ for which the end face effect can be ignored.

In another specific embodiment, a tube diameter d and a tube length L of the viscosity measuring microtube and a flow velocity v of the gas to be measured are determined in the steps of:

g1): drawing a curve of nitrogen viscosity measuring critical condition ignoring a slippage effect and an end face effect: determining a minimum tube diameter $d_{sc}$ of the viscosity measuring microtube for which the slippage effect can be ignored, determining a maximum tube diameter d of the viscosity measuring microtube for which the end face effect can be ignored, determining a minimum tube length $L_c$ of the viscosity measuring microtube for which the end face effect can be ignored, determining a maximum nitrogen flow velocity $v_c$ for which the end face effect can be ignored, and drawing a curve of relationship between corresponding maximum flow velocity and each of the tube diameters of a plurality of viscosity measuring microtubes of different tube lengths while satisfying a condition L>$L_c$ within a range of $d_{sc}$≤d≤$d_{ec}$, as the curve of nitrogen viscosity measuring critical condition ignoring the slippage effect and the end face effect;

g2): determining a critical pressure gradient $Dp_c$ for which a compression effect can be ignored;

g3): selecting a tube diameter d of the viscosity measuring microtube within a range of 1.1$d_{sc}$<d<0.9$d_{ec}$ in the curve of nitrogen viscosity measuring critical condition;

g4): initially determining a tube length L of the viscosity measuring microtube according to structure design requirements of the viscosity measuring apparatus;

g5): finding out corresponding maximum flow velocity $v_c$ from the curve of nitrogen viscosity measuring critical condition according to the tube diameter and the tube length initially determined, and determining the flow velocity of the gas to be measured is v≤$v_c$; and g6): checking the end face viscosity measuring deviation rate: within a flow velocity range of $v \leq v_c$, selecting two or three flow velocity values, randomly selecting two test pressures P, measuring the viscosities $\eta_{exp}$ of the gas in the order of step 1) to step 4) using the initially selected tube diameter d, at least two tube lengths L and the flow velocity v, and calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) / \left(\frac{1}{L_1} - \frac{1}{L_2}\right),$$

wherein $L_1$ and $L_2$ denote tube lengths of two viscosity measuring microtubes of the same tube diameter, respectively, and $\Delta p_1$ and $\Delta p_2$ denote pressure differences across two ends of the two viscosity measuring microtubes of the same tube diameter, respectively;

next, calculating an end face equivalent viscosity $\eta_{end}$ in the following formula:

$$\eta_{end} = \frac{\pi r^4}{8q} \frac{\Delta p_{end}}{L},$$

wherein r denotes a radius of the viscosity measuring microtube, r=d/2, L denotes a tube length of the viscosity measuring microtube, $L=L_1$ or $L_2$, and q denotes a gas volume flow rate;

next, calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the tube diameter d; finding a maximum viscosity measuring deviation rate $\eta_{er,\ max}$ measured under two pressures from the curve, and if the maximum viscosity measuring deviation rate $\eta_{er,\ max}$ measured under two pressures is larger than 0.2%, fine-tuning the flow velocity, the tube diameter or the tube length for viscosity measurement until $\eta_{er,\ max}$ is less than 0.2%.

Further, the minimum tube diameter $d_{sc}$ of the viscosity measuring microtube for which the slippage effect can be ignored is determined in the steps of:

h1): calculating a molecular free path of the gas to be measured in the following formula:

$$\lambda = \frac{k_B T}{\sqrt{2}\, \pi d_m^2 P},$$

wherein $\lambda$ denotes a molecular free path, $k_B$ denotes a Boltzmann constant, T denotes a Kelvin temperature, $d_m$ denotes an effective diameter of a gas molecule, and P is a pressure of the gas, wherein $P=(p_1+p_2)/2$;

h2): according to Knudsen theory, calculating a critical tube diameter $d_c$ for which the slippage effect of the gas can be ignored when Kn=0.001: $d_c=\lambda/Kn$, drawing a curve of relationship between the critical tube diameter $d_c$ and the pressure P, and determining a maximum value $d_{c,\ max}$ of the critical tube diameter $d_c$ in the curve;

h3): connecting a plurality of viscosity measuring microtubes of different tube diameters into the microtube connector, respectively, and sequentially testing the viscosities $\eta_{exp}$ of the gas for each of the viscosity measuring microtubes at different pressure differences in the order of step 1) to step 4), under a normal pressure and a condition that the pressure difference $\Delta p$ across the two ends of the viscosity measuring microtube is less than 0.2 MPa;

h4): drawing a curve of relationship between the viscosity $\eta_{exp}$ of the gas and the tube diameter d, wherein in the curve, the viscosity of the gas that does not vary with the increase of the tube diameter d is a viscosity $\eta_{exp}$ of the gas for which the slippage effect can be ignored; and h5): calculating a slippage viscosity measuring deviation rate $\eta_{sr}$ of each of the viscosity measuring microtubes: $\eta_{sr}=(\eta_{exp}-\eta_{ns})/\eta_{ns}$, drawing a curve of relationship between the slippage viscosity measuring deviation rate $\eta_{sr}$ and the tube diameter d, finding a tube diameter $d_1$ that is corresponding to $\eta_{sr}=0.2\%$, and if the tube diameter $d_1$ is larger than $d_{c,\ max}$, taking the tube diameter $d_1$ as the minimum tube diameter $d_{sc}$ of the viscosity measuring microtube, otherwise taking $d_{c,\ max}$ as the minimum tube diameter $d_{sc}$ of the viscosity measuring microtube.

Further, the critical pressure gradient $Dp_c$ for which the compression effect can be ignored is determined in the steps of:

j1): connecting a plurality of viscosity measuring microtubes of different tube diameters and tube lengths while satisfying a condition $d > d_{sc}$ into the microtube connector, respectively, and sequentially testing the viscosities $\eta_{exp}$ of the gas for each of the viscosity measuring microtubes at different pressure differences $\Delta p$ in the order of step 1) to step 4);

j2): drawing a curve of relationship between the viscosity $\eta_{exp}$ of the gas and an absolute value of a pressure gradient Dp, wherein $Dp=\Delta p/L$; in the curve, the viscosity $\eta_{exp}$ of the gas at which the absolute value of the pressure gradient tends to zero is a viscosity $\eta_{exp}$ of the gas for which the compression effect can be ignored; and j3): calculating a compression viscosity measuring deviation rate $\eta_{cr}$ of each of the viscosity measuring microtubes: $\eta_{cr}=(\eta_{exp}-\eta_{nc})/\eta_{nc}$, and drawing a curve of relationship between the compression viscosity measuring deviation rate $\eta_{cr}$ and the tube diameter d, wherein in the curve, the absolute value of the pressure gradient corresponding to $\eta_{cr}=0.2\%$ is a corrected critical pressure gradient $Dp_c$ for which the compression effect can be ignored.

Further, the maximum gas flow velocity $v_c$ for which the end face effect can be ignored is determined in the steps of:

k1): connecting a plurality of viscosity measuring microtubes of the same tube diameter and different tube lengths while satisfying the condition $d > d_{sc}$ into the microtube connector, respectively, and sequentially testing the viscosities $\eta_{exp}$ of the gas for each of the viscosity measuring microtubes at different gas flow velocities in the order of step 1) to step 4) under a condition that the pressure difference $\Delta p$ across the two ends of the viscosity measuring microtube is less than $Dp_c \cdot L$;

k2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) / \left(\frac{1}{L_1} - \frac{1}{L_2}\right),$$

wherein $L_1$ and $L_2$ denote tube lengths of any two viscosity measuring microtubes, respectively, and $\Delta p_1$ and $\Delta p_2$ denote pressure differences across two ends of the two viscosity measuring microtubes, respectively;

k3): calculating an end face equivalent viscosity $\eta_{end}$ in the following formula:

$$\eta_{end} = \frac{\pi r^4}{8q} \frac{\Delta p_{end}}{L},$$

wherein r denotes a radius of the viscosity measuring microtube, r=d/2, L denotes a tube length of the viscosity measuring microtube, L=$L_1$ or $L_2$, and q denotes a gas volume flow rate; and k4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the flow velocity v, wherein in the curve, the flow velocity corresponding to $\eta_{er}$=0.2% is a corrected maximum flow velocity $v_c$ for which the end face effect can be ignored.

Further, the minimum tube length $L_c$ of the viscosity measuring microtube for which the end face effect can be ignored is determined in the steps of:

m1): connecting a plurality of viscosity measuring microtubes of the same tube diameter and different tube lengths while satisfying the condition d>$d_{sc}$ into the microtube connector, respectively, and measuring the viscosities $\eta_{exp}$ of the gas within a flow velocity range of v<$v_c$ in the order of step 1) to step 4), under a condition that the pressure difference across the two ends of the viscosity measuring microtube is less than $Dp_c.L$;

m2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) / \left(\frac{1}{L_1} - \frac{1}{L_2}\right),$$

wherein $L_1$ and $L_2$ denote tube lengths of any two viscosity measuring microtubes, respectively, and $\Delta p_1$ and $\Delta p_2$ denote pressure differences across two ends of the two viscosity measuring microtubes, respectively;

m3): calculating an end face equivalent viscosity $\eta_{end}$ in the following formula:

$$\eta_{end} = \frac{\pi r^4}{8q} \frac{\Delta p_{end}}{L},$$

wherein r denotes a radius of the viscosity measuring microtube, r=d/2, L denotes a tube length of the viscosity measuring microtube, L=$L_1$ or $L_2$, and q denotes a gas volume flow rate; and m4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the tube length L, wherein in the curve, the tube length corresponding to $\eta_{er}$=0.2% is a corrected minimum tube length $L_c$ for which the end face effect can be ignored.

Further, the maximum tube diameter $d_{ec}$ of the viscosity measuring microtube for which the end face effect can be ignored is determined in the steps of:

n1): selecting a plurality sets of viscosity measuring microtubes of different tube diameters while satisfying the conditions d>$d_{sc}$ and L>$L_c$, each set having two viscosity measuring microtubes of different tube lengths, connecting each of the viscosity measuring microtubes into the microtube connector, and measuring the viscosities $\eta_{exp}$ of the gas for each of the viscosity measuring microtubes within the flow velocity range of v<$v_c$ in the order of step 1) to step 4), under the condition that the pressure difference across the two ends of the viscosity measuring microtube is greater than $Dp_c.L$;

n2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) / \left(\frac{1}{L_1} - \frac{1}{L_2}\right),$$

wherein $L_1$ and $L_2$ denote tube lengths of two viscosity measuring microtubes of the same tube diameter, respectively, and $\Delta p_1$ and $\Delta p_2$ denote pressure differences across two ends of the two viscosity measuring microtubes of the same tube diameter, respectively;

n3): calculating an end face equivalent viscosity $\eta_{end}$ in the following formula:

$$\eta_{end} = \frac{\pi r^4}{8q} \frac{\Delta p_{end}}{L},$$

wherein r denotes a radius of the viscosity measuring microtube, r=d/2, L denotes a tube length of the viscosity measuring microtube, L=$L_1$ or $L_2$, and q denotes a gas volume flow rate; and n4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the tube diameter d, wherein in the curve, the tube diameter corresponding to $\eta_{er}$=0.2% is a corrected maximum tube diameter $d_{ec}$ for which the end face effect can be ignored.

The high-temperature, high-pressure and low-velocity gas microtube viscosity measuring apparatus and the measuring method thereof provided by the present invention are simple and convenient in operations, overcome the technical bottleneck of the existing capillary viscometer measuring the gas viscosity, and can accurately measure the slight pressure difference across two ends of the short micro-tube and the tiny flow rate, thereby achieving the accurate measurement of gas viscosity under the high-temperature (≤150° C.) and high-pressure (≤120 MPa) condition in a real sense.

The above descriptions are just illustrative of exemplary specific embodiments of the present invention, rather than limiting to the scope of the present invention. Any equivalent changes and modifications made by a person skilled in the art without deviating from the concept and principle of the present invention shall fall within the protection scope of the present invention.

The invention claimed is:

1. A high-temperature, high-pressure, and low-velocity gas microtube viscosity measuring apparatus, comprising:
a thermotank;
a fluid filtering and measuring device, including a filter, a microtube connector, a flow rate measuring liquid storage tank, an automatic micro-flow rate metering device, and an intermediate container connected in order and in series via pipelines, a viscosity measuring microtube being axially fixed inside the microtube connector, the filter, the microtube connector, and the flow rate measuring liquid storage tank being located in the thermotank, and two ends of the viscosity measuring microtube being in communication with the pipelines at two ends of the microtube connector, respectively;
a micro-pressure difference metering device, two ends of which are connected to the pipelines at the two ends of the microtube connector via detection pipelines, respectively; and
a data acquisition and processing system electrically connected to the micro-pressure difference metering device and the automatic micro-flow rate metering device to receive pressure difference data and flow rate data.

2. The high-temperature, high-pressure, and low-velocity gas microtube viscosity measuring apparatus according to claim 1, wherein the microtube connector comprises:
a connector body, throughout which a front flow channel is formed axially, the front flow channel including in the following order an entry section, a front positioning section, a front sealing cavity, and an interface section, an inner diameter of the front positioning section being smaller than an inner diameter of either of the entry section and the front sealing cavity, and the inner diameter of the front sealing cavity being smaller than an inner diameter of the interface section;
a sealing cap, throughout which a rear flow channel is formed axially, the rear flow channel including in the following order a rear sealing cavity, a rear positioning section, and an exit section, an outer surface of a front end of the sealing cap being reduced in diameter to form a joint portion, the joint portion being plugged into the interface section, and the rear sealing cavity being in communication with an inner cavity of the interface section, wherein the two ends of the viscosity measuring microtube are plugged into the front positioning section and the rear positioning section in a sealed manner, respectively, and the entry section and the exit section are respectively in threaded connection with the pipelines at the two ends of the microtube connector through internal threads in a sealed manner.

3. The high-temperature, high-pressure, and low-velocity gas microtube viscosity measuring apparatus according to claim 2, wherein paraffin is filled between an inner wall of the front positioning section and an outer surface of the viscosity measuring microtube, sealant is infused into the interface section, and when the joint portion is plugged into the interface section, the sealant can be pressed into the front sealing cavity and the rear sealing cavity.

4. The high-temperature, high-pressure, and low-velocity gas microtube viscosity measuring apparatus according to claim 3, wherein the viscosity measuring microtube is a micron-scale capillary tube having a tube diameter of not less than 20 μm and a length of not less than 30 mm.

5. The high-temperature, high-pressure, and low-velocity gas microtube viscosity measuring apparatus according to claim 1, wherein the viscosity measuring microtube is a micron-scale capillary tube having a tube diameter of not less than 20 μm and a length of not less than 30 mm.

6. A measuring method of the high-temperature, high-pressure, and low-velocity gas microtube viscosity measuring apparatus according to claim 1, comprising the steps of:
1) selecting and mounting a viscosity measuring microtube having an appropriate tube diameter into the microtube connector, and adjusting the thermotank to a measurement temperature;
2) delivering a gas to be measured at a selected flow velocity from an input pipeline through the filter for filtration, and through the viscosity measuring microtube of the microtube connector into the flow rate measuring liquid storage tank, so that the gas to be measured drives a measuring liquid in the flow rate measuring liquid storage tank into the automatic micro-flow rate metering device;
3) transmitting pressure data at the two ends of the microtube connector measured by the micro-pressure difference metering device and flow rate data measured by the automatic micro-flow rate metering device to the data acquisition and processing system, to obtain a viscosity of the gas to be measured by calculation; and
4) changing an input pressure of the gas to be measured, and repeating steps 2) and 3) to obtain viscosities of the gas under the different pressures.

7. The measuring method of the high-temperature, high-pressure, and low-velocity gas microtube viscosity measuring apparatus according to claim 6, wherein after the data acquisition and processing system receives the pressure data and the flow rate data in step 3), the viscosity of the gas is calculated in the following formula:
$\mu_0 = \pi r^4 (p^2_1 - p^2_2)/16 Q \beta L p_2$, wherein $p_1$ denotes a pressure of fluid at an inlet of the viscosity measuring microtube, $p_2$ denotes a pressure of fluid at an outlet of the viscosity measuring microtube, L denotes a length of the viscosity measuring microtube, r denotes a radius of the viscosity measuring microtube, Q denotes a flow rate volume measured by the automatic micro-flow rate metering device, and $\beta$ denotes a temperature correction coefficient of the measuring liquid.

8. The measuring method of the high-temperature, high-pressure, and low-velocity gas microtube viscosity measuring apparatus according to claim 7, wherein a tube diameter d and a tube length L of the viscosity measuring microtube and a flow velocity v of the gas to be measured are determined in the steps of:
a1): drawing a curve of viscosity measuring critical condition ignoring a slippage effect and an end face effect: determining a minimum tube diameter $d_{sc}$ of the viscosity measuring microtube for which the slippage effect can be ignored, determining a maximum tube diameter $d_{ec}$ of the viscosity measuring microtube for which the end face effect can be ignored, determining a minimum tube length $L_c$ of the viscosity measuring microtube for which the end face effect can be ignored, determining a maximum gas flow velocity $v_c$ for which the end face effect can be ignored, and drawing a curve of relationship between corresponding maximum flow velocity and each of the tube diameters of a plurality of viscosity measuring microtubes of different tube lengths while satisfying a condition $L > L_c$ within a range of $d_{sc} \leq d \leq d_{ec}$, as the curve of viscosity measuring critical condition ignoring the slippage effect and the end face effect;
a2): determining a critical pressure gradient $Dp_c$ for which a compression effect can be ignored;
a3): selecting a tube diameter d of the viscosity measuring microtube within a range of $1.1 d_{sc} < d < 0.9 d_{ec}$ in the curve of viscosity measuring critical condition;
a4): initially determining a tube length L of the viscosity measuring microtube according to structure design requirements of the viscosity measuring apparatus;
a5): finding out corresponding maximum flow velocity $v_c$ from the curve of viscosity measuring critical condition according to the tube diameter and the tube length initially determined, and determining the flow velocity of the gas to be measured is $v \leq 0.8 v_c$; and a6): checking the compression effect: testing pressure data $p_1$ and $p_2$ at two ends of the viscosity measuring microtube using the tube diameter d, the tube length L and the flow velocity v initially selected in the order of step 1) to step 3), to obtain a pressure difference $\Delta p = p_1 - p_2$; checking the compression effect with the measured pressure difference $\Delta p$, and if $|\Delta p/L| \leq Dp_c$, the tube diameter d, the tube length L and the flow velocity v initially selected are appropriate, otherwise increasing the tube length L or decreasing the flow velocity v until $|\Delta p/L| \leq Dp_c$.

9. The measuring method of the high-temperature, high-pressure, and low-velocity gas microtube viscosity measuring apparatus according to claim 8, wherein the minimum tube diameter $d_{sc}$ of the viscosity measuring microtube for which the slippage effect can be ignored is determined in the steps of:

b1): calculating a molecular free path of the gas to be measured in the following formula:

$$\lambda = \frac{k_B T}{\sqrt{2}\, \pi d_m^2 P},$$

wherein $\lambda$ denotes a molecular free path, $k_B$ denotes a Boltzmann constant, T denotes a Kelvin temperature, $d_m$ denotes an effective diameter of a gas molecule, and P is a pressure of the gas, wherein $P = (p_1 + p_2)/2$;

b2): according to Knudsen theory, calculating a critical tube diameter $d_c$ for which the slippage effect of the gas can be ignored when Kn=0.001: $d_c = \lambda/Kn$, drawing a curve of relationship between the critical tube diameter $d_c$ and the pressure P, and determining a maximum value $d_{c,\,max}$ of the critical tube diameter $d_c$ in the curve;

b3): connecting a plurality of viscosity measuring microtubes of different tube diameters into the microtube connector, respectively, and sequentially testing the viscosities $\eta_{exp}$ of the gas for each of the viscosity measuring microtubes at different pressure differences in the order of step 1) to step 4), under a normal pressure and a condition that the pressure difference $\Delta p$ across the two ends of the viscosity measuring microtube is less than 0.2 MPa;

b4): drawing a curve of relationship between the viscosity $\eta_{exp}$ of the gas and the tube diameter d, wherein in the curve, the viscosity of the gas that does not vary with the increase of the tube diameter d is a viscosity $\eta_{exp}$ of the gas for which the slippage effect can be ignored; and b5): calculating a slippage viscosity measuring deviation rate $\eta_{sr}$ of each of the viscosity measuring microtubes: $\eta_{sr} = (\eta_{exp} - \eta_{ns})/\eta_{ns}$, drawing a curve of relationship between the slippage viscosity measuring deviation rate $\eta_{sr}$ and the tube diameter d, finding a tube diameter $d_1$ that is corresponding to $\eta_{sr} = 0.2\%$, and if the tube diameter $d_1$ is larger than $d_{c,\,max}$, taking the tube diameter $d_1$ as the minimum tube diameter $d_{sc}$ of the viscosity measuring microtube, otherwise taking $d_{c,\,max}$ as the minimum tube diameter $d_{sc}$ of the viscosity measuring microtube.

10. The measuring method of the high-temperature, high-pressure, and low-velocity gas microtube viscosity measuring apparatus according to claim 9, wherein the critical pressure gradient $Dp_c$ for which the compression effect can be ignored is determined in the steps of:

c1): connecting a plurality of viscosity measuring microtubes of different tube diameters and tube lengths while satisfying a condition $d > d_{sc}$ into the microtube connector, respectively, and sequentially testing the viscosities $\eta_{exp}$ of the gas for each of the viscosity measuring microtubes at different pressure differences $\Delta p$ in the order of step 1) to step 4);

c2): drawing a curve of relationship between the viscosity $\eta_{exp}$ of the gas and an absolute value of a pressure gradient Dp, wherein $Dp = \Delta p/L$; in the curve, the viscosity $\eta_{exp}$ of the gas at which the absolute value of the pressure gradient tends to zero is a viscosity $\eta_{exp}$ of the gas for which the compression effect can be ignored; and c3): calculating a compression viscosity measuring deviation rate $\eta_{cr}$ of each of the viscosity measuring microtubes: $\eta_{cr} = (\eta_{exp} - \eta_{nc})/\eta_{nc}$, and drawing a curve of relationship between the compression viscosity measuring deviation rate $\eta_{cr}$ and the tube diameter d, wherein in the curve, the absolute value of the pressure gradient corresponding to $\eta_{cr} = 0.2\%$ is a corrected critical pressure gradient $Dp_c$ for which the compression effect can be ignored.

11. The measuring method of the high-temperature, high-pressure, and low-velocity gas microtube viscosity measuring apparatus according to claim 10, wherein the maximum gas flow velocity $v_c$ for which the end face effect can be ignored is determined in the steps of:

d1): connecting a plurality of viscosity measuring microtubes of the same tube diameter and different tube lengths while satisfying the condition $d > d_{sc}$ into the microtube connector, respectively, and sequentially testing the viscosities $\eta_{exp}$ of the gas for each of the viscosity measuring microtubes at different gas flow velocities in the order of step 1) to step 4) under a condition that the pressure difference $\Delta p$ across the two ends of the viscosity measuring microtube is less than $Dp_c \cdot L$;

d2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right)\!\left(\frac{1}{L_1} - \frac{1}{L_2}\right),$$

wherein $L_1$ and $L_2$ denote tube lengths of any two viscosity measuring microtubes, respectively, and $\Delta p_1$ and $\Delta p_2$ denote pressure differences across two ends of the two viscosity measuring microtubes, respectively;

d3): calculating an end face equivalent viscosity $\eta_{end}$ in the following formula:

$$\eta_{end} = \frac{\pi r^4}{\partial q}\frac{\Delta p_{end}}{L},$$

wherein r denotes a radius of the viscosity measuring microtube, $r = d/2$, L denotes a tube length of the viscosity measuring microtube, $L = L_1$ or $L_2$, and q denotes a gas volume flow rate; and d4): calculating an end face viscosity measuring deviation rate $\eta_{er}$ of each of the viscosity measuring microtubes: $\eta_{er} = \eta_{end}/\eta_{exp}$, and drawing a curve of relationship between the end face viscosity measuring deviation rate $\eta_{er}$ and the flow velocity v, wherein in the curve, the flow velocity corresponding to $\eta_{er}=0.2\%$ is a corrected maximum flow velocity $v_c$ for which the end face effect can be ignored.

12. The measuring method of the high-temperature, high-pressure, and low-velocity gas microtube viscosity measuring apparatus according to claim 11, wherein the minimum tube length $L_c$ of the viscosity measuring microtube for which the end face effect can be ignored is determined in the steps of:

e1): connecting a plurality of viscosity measuring microtubes of the same tube diameter and different tube lengths while satisfying the condition $d>d_{sc}$ into the microtube connector, respectively, and measuring the viscosities $\eta_{exp}$ of the gas within a flow velocity range of $v<v_c$ in the order of step 1) to step 4), under a condition that the pressure difference across the two ends of the viscosity measuring microtube is less than $Dp_c \cdot L$;

e2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) \Big/ \left(\frac{1}{L_1} - \frac{1}{L_2}\right),$$

wherein $L_1$ and $L_2$ denote tube lengths of any two viscosity measuring microtubes, respectively, and $\Delta p_1$ and $\Delta p_2$ denote pressure differences across two ends of the two viscosity measuring microtubes, respectively;

e3): calculating an end face equivalent viscosity $\eta_{end}$ in the following formula:

$$\eta_{end} = \frac{\pi r^4}{\partial q} \frac{\Delta p_{end}}{L},$$

wherein r denotes a radius of the viscosity measuring microtube, $r=d/2$, L denotes a tube length of the viscosity measuring microtube, $L=L_1$ or $L_2$, and q denotes a gas volume flow rate;

e4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the tube length L, wherein in the curve, the tube length corresponding to $\eta_{er}=0.2\%$ is a corrected minimum tube length $L_c$ for which the end face effect can be ignored.

13. The measuring method of the high-temperature, high-pressure, and low-velocity gas microtube viscosity measuring apparatus according to claim 12, wherein the maximum tube diameter $d_{ec}$ of the viscosity measuring microtube for which the end face effect can be ignored is determined in the steps of:

f1): selecting a plurality sets of viscosity measuring microtubes of different tube diameters while satisfying the conditions $d>d_{sc}$ and $L>L_c$, each set having two viscosity measuring microtubes of different tube lengths, connecting each of the viscosity measuring microtubes into the microtube connector, and measuring the viscosities $\eta_{exp}$ of the gas for each of the viscosity measuring microtubes within the flow velocity range of $v<v_c$ in the order of step 1) to step 4), under the condition that the pressure difference across the two ends of the viscosity measuring microtube is less than $Dp_c \cdot L$;

f2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) \Big/ \left(\frac{1}{L_1} - \frac{1}{L_2}\right),$$

wherein $L_1$ and $L_2$ denote tube lengths of two viscosity measuring microtubes of the same tube diameter, respectively, and $\Delta p_1$ and $\Delta p_2$ denote pressure differences across two ends of the two viscosity measuring microtubes of the same tube diameter, respectively;

f3): calculating an end face equivalent viscosity $\eta_{end}$ in the following formula:

$$\eta_{end} = \frac{\pi r^4}{\partial q} \frac{\Delta p_{end}}{L},$$

wherein r denotes a radius of the viscosity measuring microtube, $r=d/2$, L denotes a tube length of the viscosity measuring microtube, $L=L_1$ or $L_2$, and q denotes a gas volume flow rate; and f4): calculating an end face viscosity measuring deviation rate $\eta_{er}$ of each of the viscosity measuring microtubes: $\eta_{er}=\eta_{end}/\eta_{exp}$ and drawing a curve of relationship between the end face viscosity measuring deviation rate $\eta_{er}$ and the tube diameter d, wherein in the curve, the tube diameter corresponding to $\eta_{er}=0.2\%$ is a corrected maximum tube diameter $d_{ec}$ for which the end face effect can be ignored.

14. The measuring method of the high-temperature, high-pressure, and low-velocity gas microtube viscosity measuring apparatus according to claim 7, wherein a tube diameter d and a tube length L of the viscosity measuring microtube and a flow velocity v of the gas to be measured are determined in the steps of:

g1): drawing a curve of nitrogen viscosity measuring critical condition ignoring a slippage effect and an end face effect: determining a minimum tube diameter $d_{sc}$ of the viscosity measuring microtube for which the slippage effect can be ignored, determining a maximum tube diameter $d_{ec}$ of the viscosity measuring microtube for which the end face effect can be ignored, determining a minimum tube length $L_c$ of the viscosity measuring microtube for which the end face effect can be ignored, determining a maximum nitrogen flow velocity $v_c$ for which the end face effect can be ignored, and drawing a curve of relationship between corresponding maximum flow velocity and each of the tube diameters of a plurality of viscosity measuring microtubes of different tube lengths while satisfying a condition $L>L_c$ within a range of $d_{sc} \leq d \leq d_{ec}$, as the curve of nitrogen viscosity measuring critical condition ignoring the slippage effect and the end face effect;

g2): determining a critical pressure gradient $Dp_c$ for which a compression effect can be ignored;

g3): selecting a tube diameter d of the viscosity measuring microtube within a range of $1.1d_{sc}<d<0.9d_{ec}$ in the curve of nitrogen viscosity measuring critical condition;

g4): initially determining a tube length L of the viscosity measuring microtube according to structure design requirements of the viscosity measuring apparatus;

g5): finding out corresponding maximum flow velocity $v_c$ from the curve of nitrogen viscosity measuring critical condition according to the tube diameter and the tube length initially determined, and determining the flow velocity of the gas to be measured is $v \leq v_c$; and g6): checking the end face viscosity measuring deviation rate: within a flow velocity range of $v \leq v_c$, selecting two or three flow velocity values, randomly selecting two test pressures P, measuring the viscosities $\eta_{exp}$ of the gas in the order of step 1) to step 4) using the initially selected tube diameter d, at least two tube lengths L and the flow velocity v, and calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right)\left(\frac{1}{L_1} - \frac{1}{L_2}\right),$$

wherein $L_1$ and $L_2$ denote tube lengths of two viscosity measuring microtubes of the same tube diameter, respectively, and $\Delta p_1$ and $\Delta p_2$ denote pressure differences across two ends of the two viscosity measuring microtubes of the same tube diameter, respectively;

next, calculating an end face equivalent viscosity $\eta_{end}$ the following formula:

$$\eta_{end} = \frac{\pi r^4}{\partial q} \frac{\Delta p_{end}}{L},$$

wherein r denotes a radius of the viscosity measuring microtube, r=d/2, L denotes a tube length of the viscosity measuring microtube, $L=L_1$ or $L_2$, and q denotes a gas volume flow rate;

next, calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the tube diameter d; finding a maximum viscosity measuring deviation rate $\eta_{er, max}$ measured under two pressures from the curve, and if the maximum viscosity measuring deviation rate $\eta_{er, max}$ measured under two pressures is larger than 0.2%, fine-tuning the flow velocity, the tube diameter or the tube length for viscosity measurement until $\eta_{er, max}$ is less than 0.2%.

15. The measuring method of the high-temperature, high-pressure, and low-velocity gas microtube viscosity measuring apparatus according to claim 14, wherein the minimum tube diameter $d_{sc}$ of the viscosity measuring microtube for which the slippage effect can be ignored is determined in the steps of:

h1): calculating a molecular free path of the gas to be measured in the following formula:

$$\lambda = \frac{k_B T}{\sqrt{2}\,\pi d_m^2 p},$$

wherein $\lambda$ denotes a molecular free path, $k_B$ denotes a Boltzmann constant, T denotes a Kelvin temperature, $d_m$ denotes an effective diameter of a gas molecule, and P is a pressure of the gas, wherein $P=(p_1+p_2)/2$;

h2): according to Knudsen theory, calculating a critical tube diameter $d_c$ for which the slippage effect of the gas can be ignored when Kn=0.001: $d_c=\lambda/Kn$, drawing a curve of relationship between the critical tube diameter $d_c$ and the pressure P, and determining a maximum value $d_{c, max}$ of the critical tube diameter $d_c$ in the curve;

h3): connecting a plurality of viscosity measuring microtubes of different tube diameters into the microtube connector, respectively, and sequentially testing the viscosities $\eta_{exp}$ of the gas for each of the viscosity measuring microtubes at different pressure differences in the order of step 1) to step 4), under a normal pressure and a condition that the pressure difference $\Delta p$ across the two ends of the viscosity measuring microtube is less than 0.2 MPa;

h4): drawing a curve of relationship between the viscosity $\eta_{exp}$ of the gas and the tube diameter d, wherein in the curve, the viscosity of the gas that does not vary with the increase of the tube diameter d is a viscosity $\eta_{exp}$ of the gas for which the slippage effect can be ignored; and h5): calculating a slippage viscosity measuring deviation rate $\eta_{sr}$ of each of the viscosity measuring microtubes: $\eta_{sr}=(\eta_{exp}-\eta_{ns})/\eta_{ns}$, drawing a curve of relationship between the slippage viscosity measuring deviation rate $\eta_{sr}$ and the tube diameter d, finding a tube diameter $d_1$ that is corresponding to $\eta_{sr}=0.2\%$, and if the tube diameter $d_1$ is larger than $d_{c, max}$, taking the tube diameter $d_1$ as the minimum tube diameter $d_{sc}$ of the viscosity measuring microtube, otherwise taking $d_{c, max}$ as the minimum tube diameter $d_{sc}$ of the viscosity measuring microtube.

16. The measuring method of the high-temperature, high-pressure, and low-velocity gas microtube viscosity measuring apparatus according to claim 15, wherein the critical pressure gradient $Dp_c$ for which the compression effect can be ignored is determined in the steps of:

j1): connecting a plurality of viscosity measuring microtubes of different tube diameters and tube lengths while satisfying a condition $d>d_{sc}$ into the microtube connector, respectively, and sequentially testing the viscosities $\eta_{exp}$ of the gas for each of the viscosity measuring microtubes at different pressure differences $\Delta p$ in the order of step 1) to step 4);

j2): drawing a curve of relationship between the viscosity $\eta_{exp}$ of the gas and an absolute value of a pressure gradient Dp, wherein $Dp=\Delta p/L$; in the curve, the viscosity $\eta_{exp}$ of the gas at which the absolute value of the pressure gradient tends to zero is a viscosity $\eta_{exp}$ of the gas for which the compression effect can be ignored; and j3): calculating a compression viscosity measuring deviation rate $\eta_{er}$ of each of the viscosity measuring microtubes: $\eta_{cr}=(\eta_{exp}-\eta_{nc})/\eta_{nc}$, and drawing a curve of relationship between the compression viscosity measuring deviation rate $\eta_{cr}$ and the tube diameter d, wherein in the curve, the absolute value of the pressure gradient corresponding to $\eta_{cr}=0.2\%$ is a corrected critical pressure gradient $Dp_c$ for which the compression effect can be ignored.

17. The measuring method of the high-temperature, high-pressure, and low-velocity gas microtube viscosity measuring apparatus according to claim 16, wherein the maximum gas flow velocity $v_c$ for which the end face effect can be ignored is determined in the steps of:

k1): connecting a plurality of viscosity measuring microtubes of the same tube diameter and different tube lengths while satisfying the condition $d>d_{sc}$ into the microtube connector, respectively, and sequentially testing the viscosities $\eta_{exp}$ of the gas for each of the viscosity measuring microtubes at different gas flow velocities in the order of step 1) to step 4) under a condition that the pressure difference $\Delta p$ across the two ends of the viscosity measuring microtube is less than $Dp_c \cdot L$;

k2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) \Big/ \left(\frac{1}{L_1} - \frac{1}{L_2}\right),$$

wherein $L_1$ and $L_2$ denote tube lengths of any two viscosity measuring microtubes, respectively, and $\Delta p_1$ and $\Delta p_2$ denote pressure differences across two ends of the two viscosity measuring microtubes, respectively;

k3): calculating an end face equivalent viscosity $\eta_{end}$ in the following formula:

$$\eta_{end} = \frac{\pi r^4}{\partial q} \frac{\Delta p_{end}}{L},$$

wherein r denotes a radius of the viscosity measuring microtube, $r=d/2$, L denotes a tube length of the viscosity measuring microtube, $L=L_1$ or $L_2$, and q denotes a gas volume flow rate; and k4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the flow velocity v, wherein in the curve, the flow velocity corresponding to $\eta_{er}=0.2\%$ is a corrected maximum flow velocity $v_c$ for which the end face effect can be ignored.

18. The measuring method of the high-temperature, high-pressure, and low-velocity gas microtube viscosity measuring apparatus according to claim 17, wherein the minimum tube length $L_c$ of the viscosity measuring microtube for which the end face effect can be ignored is determined in the steps of:

m1): connecting a plurality of viscosity measuring microtubes of the same tube diameter and different tube lengths while satisfying the condition $d>d_{sc}$ into the microtube connector, respectively, and measuring the viscosities $\eta_{exp}$ of the gas within a flow velocity range of $v<v_c$ in the order of step 1) to step 4), under a condition that the pressure difference across the two ends of the viscosity measuring microtube is less than $Dp_c \cdot L$;

m2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) \Big/ \left(\frac{1}{L_1} - \frac{1}{L_2}\right),$$

wherein $L_1$ and $L_2$ denote tube lengths of any two viscosity measuring microtubes, respectively, and $\Delta p_1$ and $\Delta p_2$ denote pressure differences across two ends of the two viscosity measuring microtubes, respectively;

m3): calculating an end face equivalent viscosity $\eta_{end}$ in the following formula:

$$\eta_{end} = \frac{\pi r^4}{\partial q} \frac{\Delta p_{end}}{L},$$

wherein r denotes a radius of the viscosity measuring microtube, $r=d/2$, L denotes a tube length of the viscosity measuring microtube, $L=L_1$ or $L_2$, and q denotes a gas volume flow rate; and m4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the tube length L, wherein in the curve, the tube length corresponding to $\eta_{er}=0.2\%$ is a corrected minimum tube length $L_c$ for which the end face effect can be ignored.

19. The measuring method of the high-temperature, high-pressure, and low-velocity gas microtube viscosity measuring apparatus according to claim 18, wherein the maximum tube diameter $d_{ec}$ of the viscosity measuring microtube for which the end face effect can be ignored is determined in the steps of:

n1): selecting a plurality sets of viscosity measuring microtubes of different tube diameters while satisfying the conditions $d>d_{sc}$ and $L>L_c$, each set having two viscosity measuring microtubes of different tube lengths, connecting each of the viscosity measuring microtubes into the microtube connector, and measuring the viscosities $\eta_{exp}$ of the gas for each of the viscosity measuring microtubes within the flow velocity range of $v<v_c$ in the order of step 1) to step 4), under the condition that the pressure difference across the two ends of the viscosity measuring microtube is greater than $Dp_c \cdot L$;

n2): calculating an additional pressure drop $\Delta p_{end}$ caused by the end face effect in the following formula:

$$\Delta p_{end} = \left(\frac{\Delta P_1}{L_1} - \frac{\Delta P_2}{L_2}\right) \Big/ \left(\frac{1}{L_1} - \frac{1}{L_2}\right),$$

wherein $L_1$ and $L_2$ denote tube lengths of two viscosity measuring microtubes of the same tube diameter, respectively, and $\Delta p_1$ and $\Delta p_2$ denote pressure differences across two ends of the two viscosity measuring microtubes of the same tube diameter, respectively;

n3): calculating an end face equivalent viscosity $\eta_{end}$ in the following formula:

$$\eta_{end} = \frac{\pi r^4}{\partial q} \frac{\Delta p_{end}}{L},$$

wherein r denotes a radius of the viscosity measuring microtube, $r=d/2$, L denotes a tube length of the viscosity measuring microtube, $L=L_1$ or $L_2$, and q denotes a gas volume flow rate; and n4): calculating an end face viscosity measuring deviation rate $\eta_{er}$ of each of the viscosity measuring microtubes: $\eta_{er}=\eta_{end}/\eta_{exp}$, and drawing a curve of relationship between the end face viscosity measuring deviation rate $\eta_{er}$ and the tube diameter d, wherein in the curve, the tube diameter corresponding to $\eta_{er}$=0.2% is a corrected maximum tube diameter $d_{ec}$ for which the end face effect can be ignored.

* * * * *